United States Patent Office 3,358,855
Patented Dec. 19, 1967

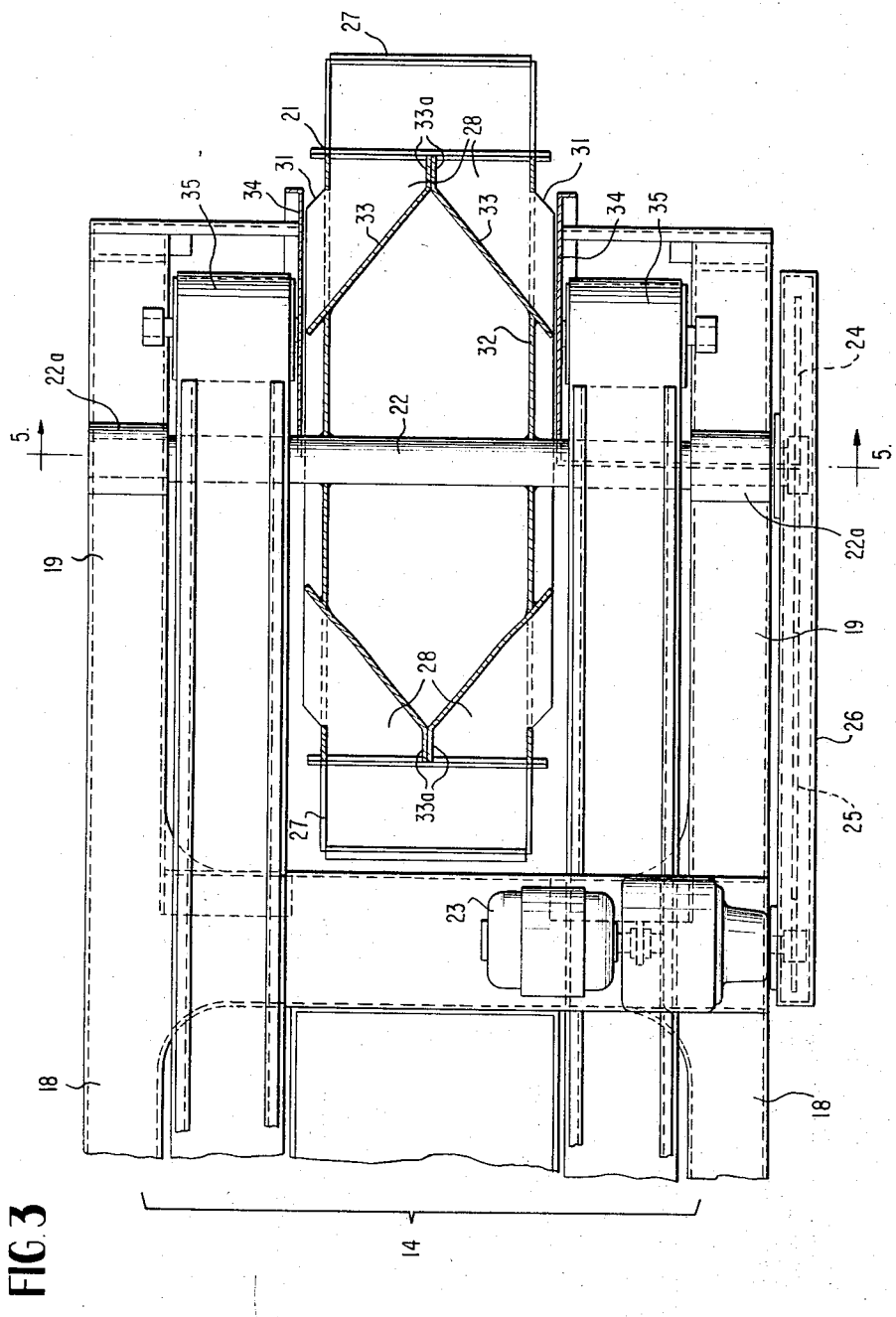

3,358,855
APPARATUS FOR RECLAIMING PARTICULATE MATERIAL FROM A PILE
Kirkendall Carlton, Hinsdale, and David A. Davis, Chicago, Ill., assignors to Link-Belt Company, a corporation of Illinois
Filed Aug. 6, 1965, Ser. No. 477,802
17 Claims. (Cl. 214—10)

This invention relates to material handling apparatus and, more particularly, to apparatus for reclaiming, handling and conveying particulate material such as mineral ores, sand, coal, gravel, etc. from a material storage pile.

In many industrial operations, it is necessary to store relatively large quantities of particulate material in large piles or stacks for subsequent use. The removal of the particulate materials from such stacks or piles is commonly referred to as reclaiming. Many different types of reclaiming devices have heretofore been employed for removing the particulate material from storage piles. One form of particulate material handling apparatus widely used in reclaiming operations employs a digging wheel having buckets spaced around the wheel periphery to pick up material from the storage pile and deposit it on a conveying means. The digging means is frequently mounted on a frame provided with mobile supporting means to enable the entire apparatus to be moved relative to the storage pile in digging out or picking up material from the pile.

Such heretofore known prior are reclaiming devices have been beset with many disadvantages. For example, the prior art digging wheels have generally been extremely large in diameter and weight and therefore cumbersome, thus making them expensive and difficult to handle or support on the equipment. The substantial diameter requirement for such a digging wheel stems from the necessity of having to carry the material picked-up by the buckets up to a high enough level that the material can then be dropped from the wheel buckets onto the conveying means which may extend through or along an end face of the digging wheel.

Where a chute is used to guide the material from the buckets to conveying means extending along an end face of the wheel the chute must lie at a sufficiently steep inclined angle to assure flow of the material down the chute without sticking. As the width of the wheel is made larger the chute at this properly inclined angle must be longer to guide the material fully out of the wheel interior to the conveying means. Thus the wheel width has had to be limited where the chute guides the material from the buckets all the way across the interior of the wheel to the conveying means and the longer the chute required for the wider wheels the larger wheel diameter required to enable the conveying means to be above ground level and still receive material falling from the end of the chute.

Another major disadvantage of prior art reclaiming devices is that the conveying means employed to receive material discharged from the wheel buckets and thereafter convey it away from the mobile reclaiming apparatus to a stationary conveyor is not capable of readily adjusting or moving as the reclaiming apparatus moves back and forth relative to the storage pile in reclaiming material from the pile.

To overcome the disadvantages of the prior art, it is an object of the present invention to provide improved particulate material handling apparatus employing a digging wheel which is relatively small in diameter and therefore easily movable and yet capable of handling large quantities of material in a short period of time.

Another object of the invention is to provide particulate material handling apparatus which is readily movable relative to a storage pile in reclaiming material from such pile as well as being economical and relatively simple in construction.

A further object of the invention is to provide improved particulate material handling apparatus including a plurality of articulated conveyor sections connected to have one end readily movable as the digging means of the apparatus moves relative to a storage pile in performing a reclaiming operation and discharge material at the other end of the conveyor sections onto a prelocated discharge point.

Still another object of the invention is to provide improved particulate material handling apparatus employing a digging wheel which may be reasonably small in diameter and still fairly wide by reason of material being discharged from both ends of the wheel.

In general the invention includes a particulate material handling apparatus comprising a frame having means mounting it to be mobile relative to the pile to be reclaimed, a digging wheel rotatably mounted adjacent one end of such frame and conveyor means mounted on the frame to extend along each end of the wheel. The wheel includes a plurality of spaced buckets on its periphery and a plurality of compartments on the interior thereof with each bucket communicating with a pair of the compartments. One of the compartments of such pair is provided with a discharge opening on one end of the wheel and the other compartment of the pair has a discharge opening on the other end of the wheel to permit material entering the compartments from the buckets to be discharged laterally through each end of the wheel to the conveyor means. The apparatus further includes a plurality of articulated movable conveyor sections attached at one end to the frame for receiving material discharged from the frame mounted conveyor means and convey the material to a suitable discharge point at the other end of the conveyor sections.

embodiment thereof will now be set forth in detail with
The invention having been broadly described a specific embodiment thereof will now be set forth in detail with reference to the accompanying drawings in which FIGURE 1 is an isometric view of a particulate material handling apparatus according to the present invention;

FIGURE 3 is a top plan view of the digging wheel end portion of the apparatus of the present invention with the wheel being shown in section;

Figure 1:
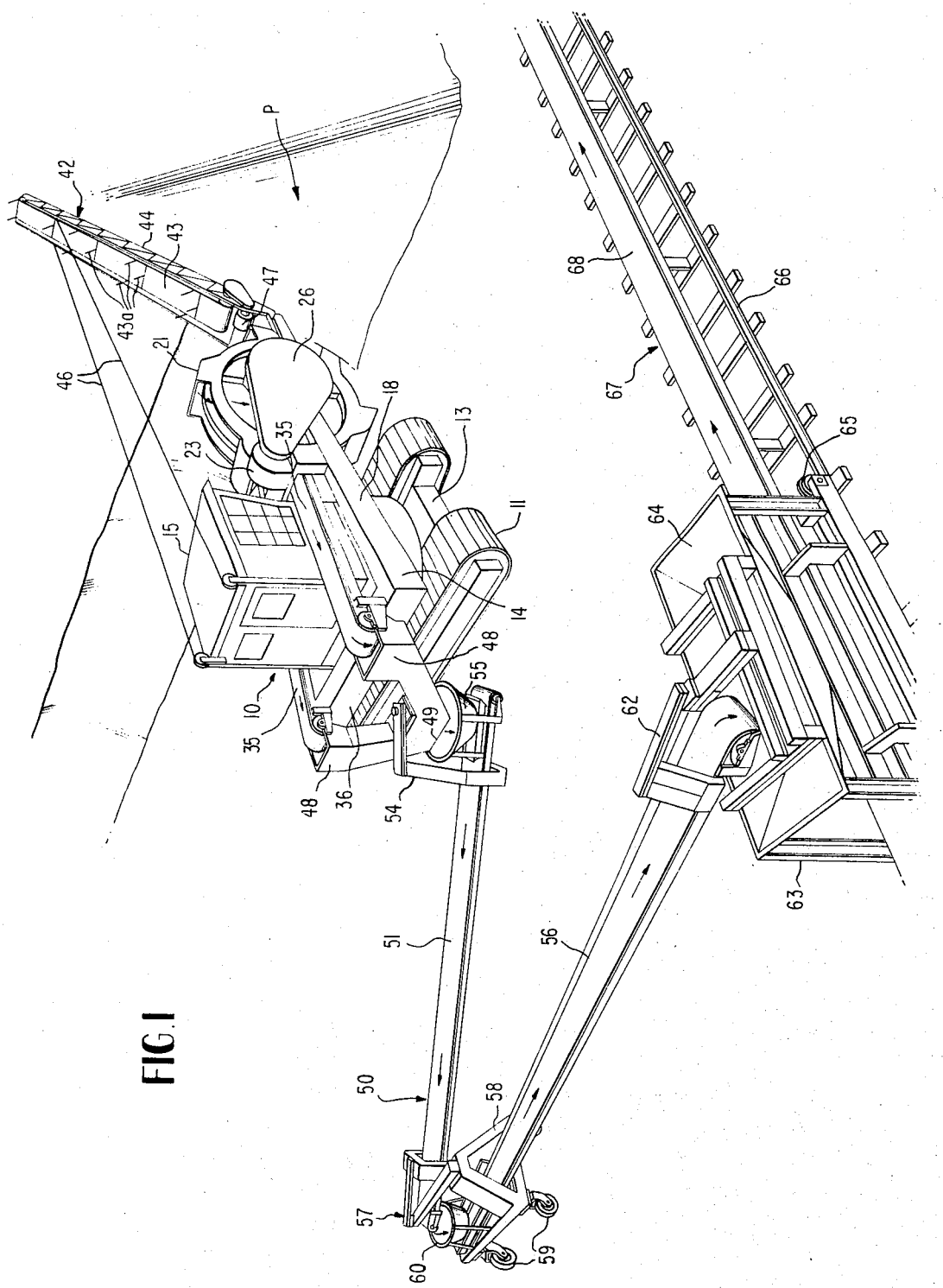

Illustrated on the drawings is a mobile unit generally identified by the numeral 10. This mobile unit is supported on a pair of endless crawler tracks 11 and incorporates a subframe 12 rotatably mounted on a turntable base 13, the turntable base carrying the crawler tracks 11 which are suitably driven to maneuver the mobile unit relative to the pile in performing a reclaiming operation. The subframe 12, turntable base 13 and crawler tracks 11 are generally comparable to the corresponding type components employed in power shovels and cranes. Thus the subframe 12 may be rotated relative to the turntable base 13 to face the equipment relative to the crawler tracks for the desired operation to be performed and the turntable base moved forward or backward by simultaneously driving the crawler tracks or turned by driving one crawler track and braking the other one.

A main frame 14 is adjustably mounted on the subframe 12 and an operator's cab 15 mounted on the main frame 14. The main frame is connected to the subframe to be vertically adjustable by a pivot 16 at one end of the subframe 12 and a lifting jack 17 at the opposite end of the subframe, these items being best illustrated in FIGURE 2. Vertical extension of lifting jack 17 causes the main frame 14 to pivot about the pivot point 16 thereby raising the front end of main frame 14. This raising or lowering of the front end of frame 14 is useful in locating the digging wheel at the proper elevation for the reclaiming operation desired.

The turntable base 13 permits the main frame 14 as well as subframe 12 to be rotated to any desired position with respect to the crawler tracks 11 of the mobile unit. As is conventional in power shovels and cranes, a suitable motor and gear reducer drive means 12a is mounted on subframe 12 coupled to rotate the main frame and subframe relative to the crawler tracks 11 and/or selectively drive the two crawler tracks 11, all in response to manipulation of appropriate operator's controls in cab 15.

The main frame 14 incorporates a pair of spaced parallel side members 18 extending along the opposite sides of the main frame with each side member 18 having a downwardly extending portion 19 at the forward end thereof. A digging wheel 21 is fixed to a shaft 22 extending between and rotatably supported in bearings 22a carried on portions 19 of the side members 18. Power for rotating the wheel 21 is supplied by a motor 23 mounted on frame 14 in front of the cab 15 of the mobile unit 10. A driving sprocket 24 is fixed on shaft 22 to receive power transmitted from the motor 23 by a suitable drive chain 25. The sprocket 24 and chain 25 may be enclosed in a protective housing 26.

The digging wheel 21 includes a plurality of buckets 27 spaced around its periphery which communicate radially inwardly with a plurality of compartments 28 on the interior of the wheel. It will be noted that for each bucket 27 there are two compartments to receive material passing radially inwardly from each bucket, one compartment adjacent each axial end of wheel 21. Each of the compartments 28 is provided with a discharge opening 29 which opens through an end of the wheel 21.

Figure 5:
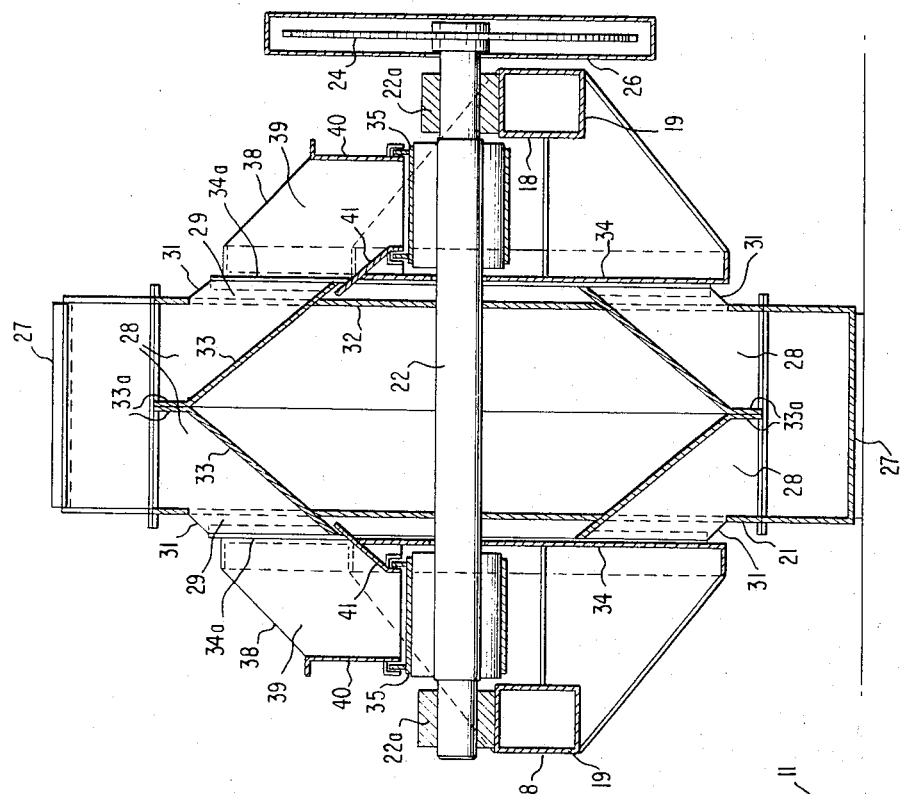
FIGURE 5 is a sectional view taken along line 5—5 of FIGURE 3.

The compartments are formed by a plurality of radial dividing walls 31, one wall 31 joining with the radially inward edge of each bucket 27. These walls 31 extend axially outwardly of the end walls 32 of the wheel, these end walls 32 being secured to shaft 22 as by welding. As best shown in FIGURES 3 and 5, the bottom of the compartments 28 between adjacent dividing walls 31 is formed by two frusto-conical members 33 secured back-to-back with the bases of the members flanged at 33a. The mating flanges of members 33 lie midway of the width of wheel 21 and extend to a point adjacent the radially inner edges of the buckets 27. The relation of these frusto-conical members 33 to each other and as they are secured to the end walls 32 and dividing walls 31 forms a bottom for each compartment 28 which slopes axially inwardly and toward the end of the wheel from the midpoint of the wheel width, the compartment bottom leading to the discharge opening 29 for the compartment at the end face of the wheel.

From the above described structure it will be apparent that material picked up by the buckets 27 incident rotation of the wheel 21 in engagement with a pile of material will fall into the compartments 28 as the wheel rotates carrying the buckets upwardly to the top of the wheel. The members 33 which form the bottom of the compartments 28 divide the wheel width in half such that the material leaving the buckets and entering the compartments will be approximately divided so that half enters the series of compartments adjacent one end of the wheel and the other half enters the series of compartments adjacent the other end of the wheel. Within each compartment the material slides down the inclined bottom of the compartment and is discharged out through the discharge opening 29.

Two stationary plates 34 are mounted on the forwardly extending portions 19 of the frame 14 and side members 18. Each plate is mounted to cover a portion of one end of the wheel 21 to prevent material from being discharged through the discharge openings 29 of the compartments as the wheel is rotated upwardly, until the buckets 27 have been rotated to a position adjacent the top of the wheel. As most clearly shown in FIGURE 2, each of the plates 34 is generally in the shape of a segment of a circle and extends from the lowermost point in the rotating path of the wheel to a point shortly before the wheel reaches the peak of its rotating path. Thus even though material, as picked-up by each bucket 27, may pass into the two compartments 28 communicating with such bucket before the bucket or associated compartments reach the desired elevation for releasing the material to the hereinafter described conveyors associated with the digging wheel, the plates 34 will keep the material within the compartments until the compartment discharge openings 29 passes the upper edge 34a of plate 34 and the proper elevation for material release has been reached.

Figure 2:
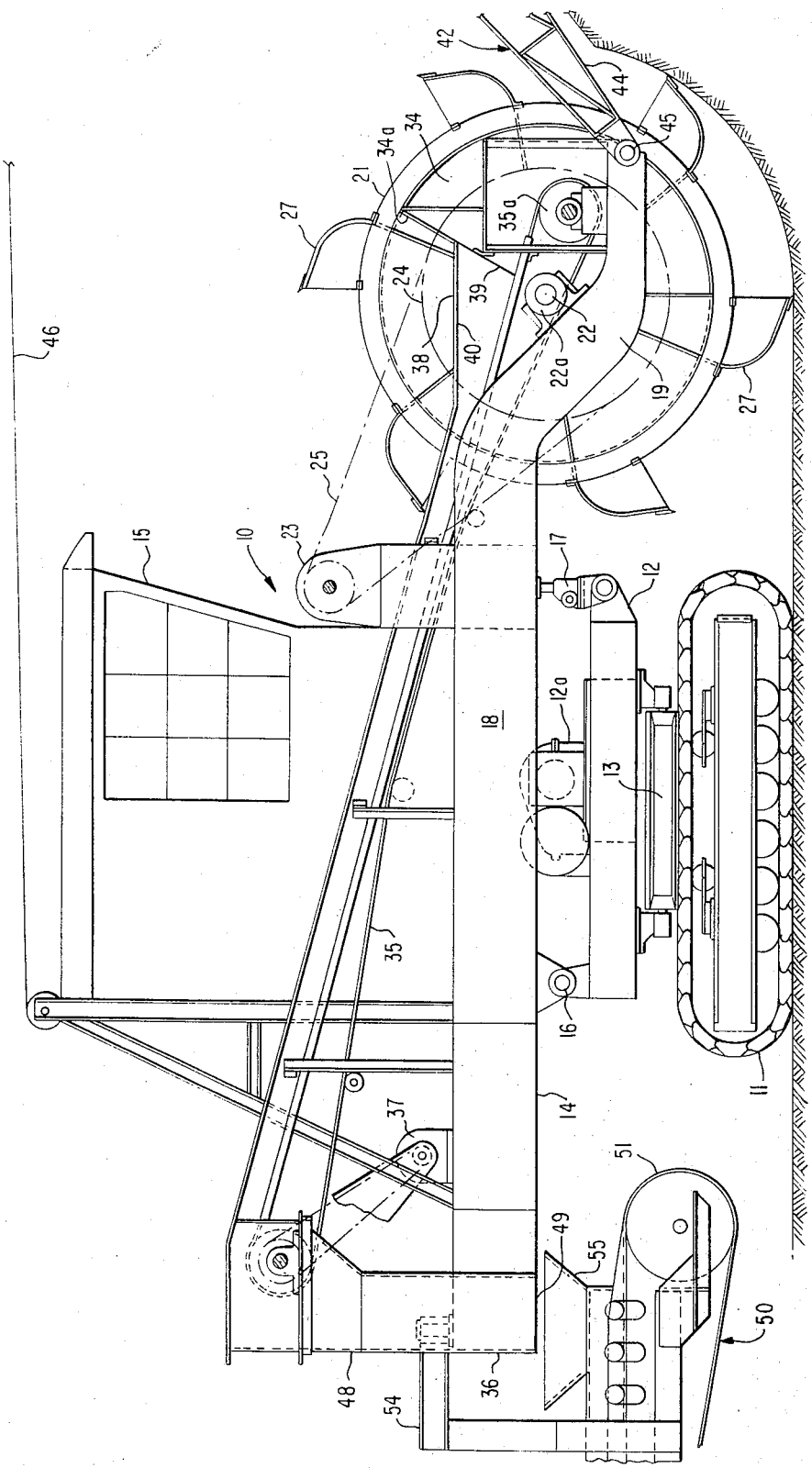
FIGURE 2 is a side elevational view of the mobile unit of the apparatus with the drive train for the digging wheel shown in phantom.

Two endless belt conveyors 35 are mounted one adjacent each end of the wheel 21 to receive material discharged therefrom. As illustrated in FIGURE 2, the conveyors 35 extend upwardly from the wheel end or forward end of main frame 14 to the rear end 36 of the frame. Conveyors 35 are illustrated as being driven by suitable power means such as motor 37 mounted adjacent the rear end 36 of the main frame 14. Each bend pully 35a at the forward end of each conveyor 35 is mounted between the end of one portion 19 of side member 18 and the adjacent plate 34. Thus the forward end of each conveyor 35 lies immediately adjacent an end of wheel 21 and below the level of release of material from discharge openings 29 as such release point is determined by the upper edges 34a of plates 34.

A chute 38 is mounted on the portions 19 of side members 18 at each end of wheel 21. The chute on each end is disposed above the conveyor 35 at such end of wheel 21 to receive material discharged from the compartments 28 and direct it to the conveyor 35. As best shown in FIGURES 2 and 5, each of the chutes 38 includes a front wall 39 extending outwardly from the end edge 34a of plate 34 and sloping downwardly from a point adjacent the top of edge 34a to a point just above the associated conveyor 35, a vertical outer wall 40 and an inner inclined wall 41. Inner wall 41 slopes downwardly from a point beneath the outer end of frustoconical member 33 to a point just above conveyor 35. As best shown in FIGURE 5, the outer end of each of the frusto-conical members 33 overlaps the inner end of wall 41 of the chute 38 with which it is associated to prevent any material from spilling as the material is discharged from the compartments 28 to the chute 38 at each end of wheel 21.

A trimmer 42 is pivotally mounted in the extremities of portions 19 of the side members 18 which are a part of main frame 14. This trimmer functions to move material from the face of a storage pile P downwardly to the base of the pile face to be picked up by the buckets on digging wheel 21. The trimmer 42 is generally comprised of an endless carrier 43 operatively mounted on a boom 44. A plurality of teeth 43a project from the face of carrier 43 to agitate the face of the pile and free material therefrom for pick up at the pile base by digging wheel 21. The lower end of boom 44 is pivotally connected to the portions 19 at pivot points 45.

The trimmer boom is raised or lowered about pivot points 45 by a pair of hoisting cables 46 controlled from a suitable hoist (not shown) in cab 15. Adjustment of the angle of inclination of trimmer 42 is made as desired or necessary to accommodate the characteristics of the material of the pile being reclaimed. The trimmer acts to bring material down from the upper areas of the pile face and generally the trimmer boom will be inclined so that the natural angle of repose for the particular pile material will be maintained, thus avoiding avalanching of material which could interfere with the operation of the digging wheel 21.

To positively move the material down the pile face during the reclaiming operation the endless carrier 43 is driven by a suitable drive 47 so that the teeth 43a are moved down along boom 44 in engagement with the pile face and thereby free material from the pile face carrying it down to the pile base.

Figure 4:
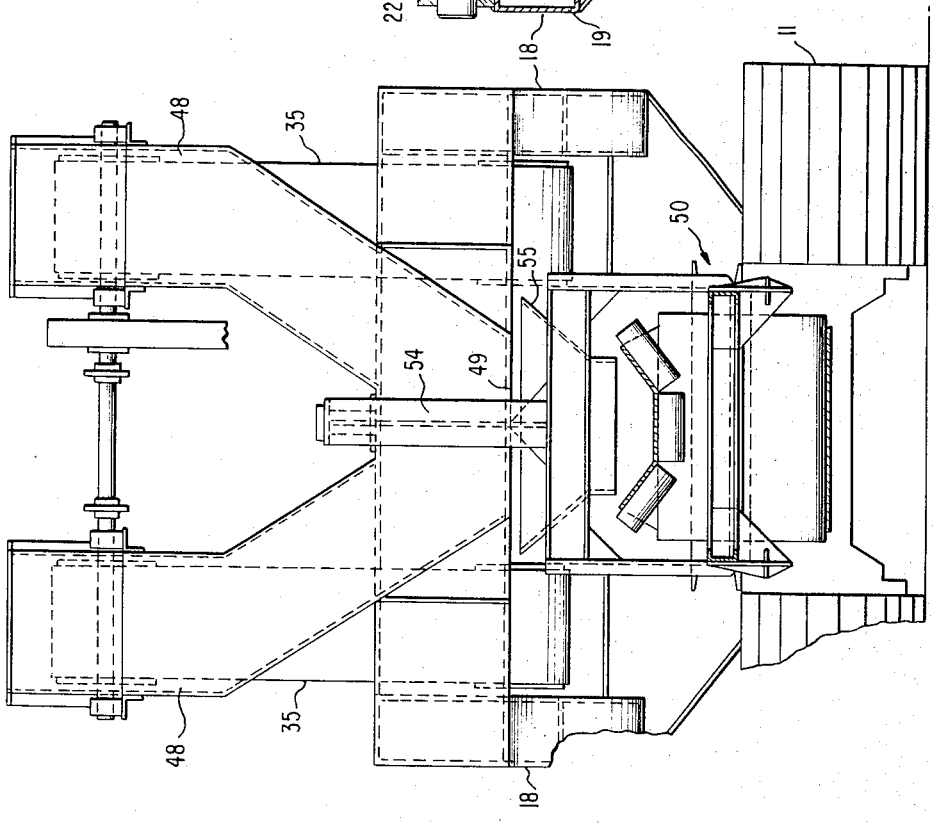
FIGURE 4 is a rear elevational view of the portion of the apparatus of the present invention shown in FIGURE 2 with the conveyor section which conveys material from the mobile unit shown in section.

Mounted on the rear end 36 of frame 14 are a pair of discharge chutes 48 which receive material from the respective conveyors 35, as best shown in FIGURES 1, 2 and 4. The discharge chutes 48 slope downwardly toward each other and are joined at their lower ends to provide a common discharge outlet 49.

An articulated conveyor assembly 50 is connected to mobile unit 10 by one end being pivotally attached to the rear end 36 of the mobile unit disposed to receive material from the discharge outlet 49 of discharge chutes 48. Conveyor assembly 50, as illustrated, is comprised of two pivotally interconnected conveyor sections with this pivotal interconnection supported on a caster mounted carriage and the discharge end of the assembly carried by a wheeled carriage and guided on tracks which are associated with a ground supported conveyor, discharging material from the conveyor assembly onto the ground supported conveyor.

The leading conveyor section 51 of the conveyor assembly 50 has its receiving end pivotally attached to the mobile unit 10 by a bracket 54 which suspends the conveyor section so that material passing from discharge outlet 49 of chutes 48 on the mobile unit will be collected in conical hopper 55 mounted on the receiving end of conveyor section 51 and directed onto the motor driven conveyor belt of section 51.

The trailing conveyor section 56 of conveyor assembly 50 is pivotally attached at 57 at its receiving end to the discharge end of the leading conveyor section 51. This pivotal interconnection between conveyor sections 51 and 56 is mounted on a carriage 58 supported on caster wheels 59 to be freely movable over the ground surface. A conical hopper 60 is carried on carriage 58 disposed beneath the discharge end of the conveyor belt of section 51 and above the receiving end of the motor driven conveyor belt of conveyor section 56 so that material is transferred from one belt to the other. A downwardly directed air supporting cushion such as employed in so called ground effect machines or other free moving support means for carriage 58 may be used in place of caster wheels 59.

The discharge end of conveyor section 56 is pivotally attached by a bracket 62 to a carriage 63 having a receptacle 64 mounted thereon to receive material discharged from the discharge end of the conveyor belt of conveyor section 56. The carriage 63 is supported on wheels 65 engaged to be movable longitudinally along a pre-determined path defined by rails 66 as shown in FIGURE 1. The wheeled carriage may be motor driven to propel it in either direction along rails 66. The controls for energization of the drive for carriage 63 and, of course, for the conveyors of sections 51 and 56 will be made available to the equipment operator in cab 15 on the mobile unit 10 as may be accomplished through use of a conventional trailing power cable. Through use of such controls the operator can position carriage 63 along rails 66 wherever and whenever may be needed incident the reclaiming operation.

Rails 66 are associated with a ground supported conveyor 67 comprised of a motor driven endless conveyor belt 68 mounted parallel to and above rails 66 for conveying away material discharged from the receptacle 65. Conveyor 67 may convey the material to any suitable location for use as required.

In operation of the particulate material handling apparatus of the present invention, the trimmer 42 by the action of teeth 43a on the endless moving carrier 43 as well as by movement of the mobile unit through driving crawler tracks 11 moves material from storage pile P down to the digging wheel 21 whereupon the buckets 27 on the periphery of the wheel pick up the material as the wheel is rotated upwardly and discharge it through the compartments 28 on each end of the wheel to the conveyors 35. As the bucket wheel is rotated upwardly the plates 34 mounted on the side members 18 adjacent each end of the wheel 21 prevent the material from being discharged until the buckets have reached a position near the top of the upward rotative path of the wheel. From the conveyors 35 the material is then discharged through chutes 48 onto conveyor section 51 of conveyor assembly 50 and thereby conveyed to conveyor section 56. The conveyor section 56 discharges the material to receptacle 65 from which it is discharged onto the conveyor 67 and conveyed to any suitable discharge point for use. The mobile unit 10 may be moved along the storage pile P during the entire operation as required to maintain the digging wheel constantly supplied with material at the base of the pile. Moreover, the main frame 14 and components associated therewith may be rotated to any desired position with respect to the turntable base 13 during operation of the apparatus to enable effective pick up of all the particulate material from the storage pile.

In reclaiming material from a pile the crawler mounting and turntable base for the mobile unit make the unit extremely versatile. The small diameter wide digging wheel with these features of the mobile unit enable easy manipulation of the equipment from the controls provided in the operator's cab of the mobile unit to pick-up material from the pile in the most efficient and expeditious sequence of movements of the mobile unit.

For reclaiming from the generally triangular end face of a pile of particulate material a preferred sequence of movements for the mobile unit 10 is to drive the crawler tracks 11 in their position as shown on FIGURE 1 to thereby move the unit parallel to the base of the pile while the digging wheel picks-up material from the base of the pile face and the trimmer 42 acts to feed material down the pile face to wheel 21. After one pass across the pile face the position of the mobile unit 10 is then changed by appropriately driving one or both of the crawler tracks 11 to move the unit toward the pile face in preparation for another pass across the pile face. These steps will be repeated to reclaim all the material from the storage pile. Of course the wheeled carriage 63 may be moved along rails 66 as appropriate to keep it suitably located relative to mobile unit 10 and the caster mounted carriage 58 between the conveyor sections will follow the movements of the mobile unit 10 and wheeled carriage 63.

It will be apparent that the particulate material handling apparatus of the present invention affords many significant advantages. Due to the fact that the digging wheel is constructed to discharge material at both ends of the wheel rather than to only one end, it is possible to have a relatively small diameter wheel of relatively large width which is easily movable and yet capable of handling large quantities of material in a short period of time. By being able to employ such a relatively small bucket wheel, the cost and weight of the apparatus are significantly less than other prior art devices of this type. Moreover, the efficiency and mobility of the apparatus are greatly increased.

A further advantage resides in the fact that the plurality of articulated conveyor sections permits the apparatus to be readily moved relative to the storage pile of particulate material and still achieve discharge of the material at a predetermined distant point of use. The pivotal connections of the articulated conveyor sections, including the caster supported carriage at the interconnection between the conveyor sections is highly advantageous in that it permits the plurality of articulated conveyor sections to automatically follow the mobile digging unit without the necessity of employing additional apparatus or personnel to transfer material from the mobile unit to a fixed predetermined point of use. Moreover, the wheeled receptacle associated with the ground supported conveyor furnishes an effective means of discharging the material from the articulated conveyor assembly to be conveyed to a suitable discharge point for use.

Although the present invention has been illustrated and described with reference to a specific embodiment, it will be understood that various modifications may be made by persons skilled in the art without departing from the scope of the invention which is defined solely by the appended claims.

We claim:

1. Apparatus for reclaiming particulate material from a pile comprising
   a movable supporting frame,
   a digging wheel mounted adjacent one end of said frame to rotate in a generally vertical plane, said wheel including a plurality of spaced buckets on its periphery and a plurality of compartments on the interior of said wheel, each of said buckets communicating with a pair of said compartments with one compartment of said pair having a discharge opening through one end of said wheel and the other compartment of said pair having a discharge opening through the other end of said wheel whereby material entering said pair of compartments from the bucket associated therewith is discharged partly from each end of said wheel,
   and a pair of belt conveyors on said frame disposed adjacent each end of said wheel to receive by gravity flow material discharged from the interior compartments of said wheel through the wheel ends and convey such material away from said wheel toward the opposite end of said frame.

2. Apparatus for reclaiming particulate material as recited in claim 1 wherein each of said wheel compartments has a radially inner wall sloping toward the wheel end with which the compartment is associated and toward the wheel axis to direct the gravity flow of the material into the adjacent belt conveyor.

3. Apparatus for reclaiming particulate material as recited in claim 1 wherein plate means is mounted on said frame adjacent each end of said wheel to cover a portion of the rotative path of said wheel and retain material in said compartments during a substantial part of the upward rotating path of the wheel compartments while permitting material to discharge from said compartments through the wheel ends as the compartments successively approach a point in the rotative path of said wheel adjacent to and above the associated belt conveyors.

4. Apparatus for reclaiming particulate material as recited in claim 1 wherein trimmer means in the form of an upwardly inclined boom with digging teeth projecting outwardly at spaced positions along said boom is mounted on said frame forwardly of said digging wheel to free material from the face of the pile being reclaimed above said wheel to be picked up by said wheel at the base of such pile, and means is provided for raising and lowering said boom to adjust the angle of inclination of said trimmer means.

5. Apparatus for reclaiming particulate material as recited in claim 4 wherein said digging teeth are mounted on an endless carrier means extending along said boom, and drive means is provided connected to drive said carrier means so as to move said digging teeth downwardly along said boom to move material down along the pile face to said digging wheel.

6. Apparatus for reclaiming particulate material from a pile comprising
   a movable supporting frame,
   a digging wheel mounted adjacent one end of said frame to rotate in a generally vertical plane, said wheel including a plurality of spaced buckets on its periphery and a plurality of compartments on the interior of said wheel, each of said compartments having a radially inner wall sloping toward one end of the wheel and toward the wheel axis, each of said buckets communicating with a pair of said compartments with one compartment of said pair having a discharge opening through one end of said wheel and the other compartment of said pair having a discharge opening through the other end of said wheel whereby material entering said pair of compartments from the bucket associated therewith is discharged partly from each end of said wheel,
   plate means mounted on said frame adjacent each end of said wheel to cover a portion of the rotative path of said wheel and retain material in said compartments during a substantial part of the upward rotating path of the wheel compartments while permitting material to discharge from said compartments through the wheel ends as the compartments successively approach an elevated point in the rotative path of said wheel,
   and a pair of belt conveyors mounted on said frame adjacent the ends of said wheel to receive by gravity flow material discharged at said elevated point from the interior compartments of said wheel through the wheel ends and convey such material away from said wheel toward the opposite end of said frame.

7. Apparatus for reclaiming particulate material as recited in claim 6 wherein chute means is mounted on said frame at each end of said wheel adjacent said elevated point in the rotative path of said wheel, said chute means receiving material discharged through the compartment discharge openings in the wheel ends and directing such material to the conveyor means associated with each wheel end.

8. Apparatus for reclaiming particulate material as recited in claim 6 wherein the conveyor means extend from each end of said wheel to the opposite end of said frame, and chute means is carried by said frame disposed to receive material discharged from both conveyor means, said chute means having a common discharge opening for discharge of the material to be transferred from the apparatus.

9. Apparatus for reclaiming particulate material from a pile comprising
   a supporting frame, said frame being mounted on a turntable base with said base having power driven crawler tracks whereby said frame is rotatable relative to the turntable base and maneuverable over a surface by driving said crawler tracks,
   a digging wheel mounted adjacent the forward end of said frame to rotate in a generally vertical plane, said wheel including a plurality of spaced buckets on its periphery and a plurality of compartments on the interior of said wheel, each of said buckets communicating with a pair of said compartments with one compartment of said pair having a discharge opening through one end of and at an elevated point on said wheel and the other compartment of said pair having a discharge opening through the other end of and at an elevated point on said wheel whereby material entering said pair of compartments from the bucket associated therewith is discharged by gravity partly from each end of said wheel,
   and a pair of belt conveyors on said frame disposed adjacent each end of said wheel to receive by gravity flow material discharged from the interior compartments of said wheel through the wheel ends and convey such material away from said wheel toward the rear end of said frame.

10. Apparatus for reclaiming particulate material from a pile comprising
a mobile supporting frame,
a digging wheel having a plurality of spaced buckets on the periphery thereof, said wheel being rotatably mounted adjacent one end of said frame, said wheel including means for discharging at an elevated point material picked up by said buckets incident rotation of said wheel laterally through each end of said wheel,
a pair of belt conveyors on said frame disposed adjacent each end of said wheel to receive by gravity flow material discharged through the wheel ends and convey such material away from said wheel to the opposite end of said frame,
articulated conveyor assembly having its receiving end pivotally attached to said opposite end of said frame disposed to receive material discharged from both of said belt conveyors,
and a material receiving receptacle pivotally attached to the discharge end of said articulated conveyor assembly to receive material conveyed thereto by said conveyor assembly from said frame carried conveyor means.

11. Apparatus for reclaiming particulate material as recited in claim 10 wherein said frame is rendered mobile by being mounted on a turntable base with said base having power driven crawler tracks whereby said frame is rotatable relative to the turntable base and maneuverable over a surface by driving said crawler tracks, the receiving end of said articulated conveyor assembly being movable with said frame while the discharge end thereof remains in a stationary position.

12. Apparatus for reclaiming particulate material as recited in claim 11 wherein trimmer means in the form of an upwardly inclined boom with digging teeth projecting outwardly at spaced positions along said boom is mounted on said frame forwardly of said digging wheel to free material from the face of the pile being reclaimed above said wheel to be picked up by said wheel at the base of such pile, and means is provided for raising and lowering said boom to adjust the angle of inclination of said trimmer means.

13. Apparatus for reclaiming particulate material as recited in claim 10 wherein said means for discharging material through each end of said wheel comprises a plurality of compartments on the interior thereof, each of said buckets communicating with a pair of said compartments with one compartment of said pair having a discharge opening through one end of and at an elevated point on said wheel and the other compartment of said pair having a discharge opening through the other end of and at an elevated point on said wheel whereby material entering said pair of compartments from the bucket associated therewith is discharged partly from each end of said wheel.

14. Apparatus for reclaiming particulate material as recited in claim 13 wherein plate means is mounted on said frame adjacent each end of said wheel to cover a portion of the rotative path of said wheel and retain material in said compartments during a substantial part of the upward rotating path of the wheel compartments while permitting material to discharge from said compartments through the wheel ends as the compartments successively approach said elevated points in the rotative path of said wheel.

15. Apparatus for reclaiming particulate material as recited in claim 10 wherein said articulated conveyor assembly comprises a pair of power driven belt conveyor sections with a pivotal interconnection between the discharge end of one conveyor section and the receiving end of the other conveyor section, and said pivotal interconnection being supported to be freely movable in any direction to respond to movements of the mobile supporting frame.

16. Apparatus for reclaiming particulate material as recited in claim 15 wherein said material receiving receptacle is disposed to discharge material onto a stationary ground supported conveyor by being mounted on a carriage having wheels engaged with rails extending parallel to said ground supported conveyor.

17. Apparatus for reclaiming particulate material from a pile comprising
a mobile supporting frame,
a digging wheel mounted adjacent one end of said frame to rotate in a generally vertical plane, said wheel including a plurality of spaced buckets on its periphery and a plurality of compartments on the interior of said wheel, each of said buckets communicating with a pair of said compartments with one compartment of said pair having a discharge opening through one end of and at an elevated point on said wheel and the other compartment of said pair having a discharge opening through the other end of and at an elevated point on said wheel,
a pair of belt conveyors on said frame disposed adjacent each end of said wheel to receive by gravity flow material discharged through the wheel ends and convey such material away from said wheel to the opposite end of said frame,
a pair of power driven conveyor belt sections having a pivotal interconnection between the discharge end of one conveyor section and the receiving end of the other conveyor section, said pivotal interconnection being supported on a carriage which is mounted on caster wheels for free movement in any direction, the receiving end of said one conveyor section being pivotally attached to said opposite end of said frame disposed to receive material discharged from both of said belt conveyors,
a material receiving receptacle pivotally attached to the discharge end of said other conveyor section to receive material from said other conveyor section, said receptacle being mounted on a carriage having wheels engaged with guiding rails for selective positioning therealong,
and a ground supported stationary conveyor extending parallel to said rails to receive material discharged from said receptacle.

References Cited

UNITED STATES PATENTS

| 3,185,290 | 5/1965 | Dietrich | 214—10 X |
| 3,225,943 | 12/1965 | Sasadi | 214—10 |
| 3,251,449 | 5/1966 | Hoppmann | 198—9 |

FOREIGN PATENTS

| 555,053 | 3/1923 | France. |
| 680,030 | 1/1930 | France. |

ROBERT G. SHERIDAN, *Primary Examiner.*

MARVIN A. CHAMPION, *Examiner.*